US008905578B2

(12) United States Patent
Svensen et al.

(10) Patent No.: US 8,905,578 B2
(45) Date of Patent: Dec. 9, 2014

(54) LASER ARRAY ILLUMINATION FOR BRIGHT PROJECTORS

(71) Applicant: Projectiondesign AS, Gamle Fredrikstad (NO)

(72) Inventors: Oyvind Svensen, Ski (NO); Kjell Einar Olsen, Krakeroy (NO); Sverre Lefsaker, Vesteroy (NO); Tobby Simonsen, Krakeroy (NO); Ronny Bjornsen, Kråkerøy (NO)

(73) Assignee: Projectdesign AG, Gamle Fredrikstad (NO)

( * ) Notice: Subject to any disclaimer, the term of this patent is extended or adjusted under 35 U.S.C. 154(b) by 0 days.

(21) Appl. No.: 13/624,659

(22) Filed: Sep. 21, 2012

(65) Prior Publication Data

US 2013/0077308 A1    Mar. 28, 2013

Related U.S. Application Data

(60) Provisional application No. 61/539,430, filed on Sep. 26, 2011.

(51) Int. Cl.
| | |
|---|---|
| *F21V 7/00* | (2006.01) |
| *G03B 21/28* | (2006.01) |
| *G03B 21/26* | (2006.01) |
| *G02B 19/00* | (2006.01) |
| *G03B 21/20* | (2006.01) |

(52) U.S. Cl.
CPC ........ *G02B 19/0066* (2013.01); *G02B 19/0057* (2013.01); *G03B 21/2066* (2013.01); *G03B 21/28* (2013.01); *G02B 19/0028* (2013.01)
USPC ........... 362/241; 362/247; 362/297; 362/300; 362/346; 353/81; 353/94; 353/99

(58) Field of Classification Search
CPC ............................ G03B 21/28; G03B 21/2066
USPC ........... 362/241, 247, 297, 300, 346; 353/37, 353/81, 94, 98, 99
See application file for complete search history.

(56) References Cited

U.S. PATENT DOCUMENTS 1,887,650 A * 11/1932 Larner et al. .................. 362/241
2,983,183 A    5/1961 Pickering
(Continued)

FOREIGN PATENT DOCUMENTS

| EP | 1107611 A2 | 6/2001 |
|---|---|---|
| EP | 1370089 A1 | 12/2003 |
| WO | 2010/108446 A1 | 9/2010 |

OTHER PUBLICATIONS

International Search Report and Written Opinion mailed Jan. 23, 2013, PCT/EP2012/068862, 17 pages.

(Continued)

*Primary Examiner* — Robert May
*Assistant Examiner* — Alexander Garlen
(74) *Attorney, Agent, or Firm* — Kilpatrick Townsend & Stockton LLP

(57) ABSTRACT

Embodiments of the present invention provide apparatuses and systems for providing illumination for projectors. One or more beam combiners are used to combine multiple light beams to provide a combined light beam toward to a pupil of an imaging device in a projector. Solid state light sources, such as diode lasers and light-emitting diodes (LEDs), may be used as light sources at relatively low cost and low power, and with long lifetime. In one embodiment, an optical beam combiner comprises a first reflective surface, a second reflective surface, and a transparent region disposed between the first reflector surface and the second reflective surface. In another embodiment, an optical device comprising an array of optical beam combiners is provided. In a further embodiment, light sources comprising a plurality of light-emitting devices mounted on curved surfaces are utilized in conjunction with an optical beam combiner to provide illumination for a projector.

14 Claims, 12 Drawing Sheets

(56) References Cited

U.S. PATENT DOCUMENTS

| | | | |
|---|---|---|---|
| 5,300,966 A * | 4/1994 | Uehira et al. | 353/30 |
| 5,305,029 A * | 4/1994 | Yoshida et al. | 353/37 |
| 5,619,284 A | 4/1997 | Magocs | |
| 5,793,527 A * | 8/1998 | Nalwa | 359/403 |
| 6,517,212 B2 * | 2/2003 | Satou | 353/99 |
| 6,765,727 B1 | 7/2004 | Chang | |
| 7,101,049 B2 * | 9/2006 | Shindoh | 353/81 |
| 7,237,929 B2 * | 7/2007 | Stahl | 362/297 |
| 7,448,758 B2 * | 11/2008 | Kim et al. | 353/81 |
| 8,066,389 B2 * | 11/2011 | Silverstein et al. | 353/119 |
| 8,496,335 B2 * | 7/2013 | Itoh | 353/94 |
| 2002/0080831 A1 | 6/2002 | Goodman | |
| 2007/0024959 A1 | 2/2007 | Peterson | |
| 2007/0242230 A1 | 10/2007 | Chen et al. | |
| 2009/0091712 A1 | 4/2009 | Lee et al. | |

OTHER PUBLICATIONS

Office Action mailed Jan. 28, 2014 in Chinese Patent Application No. 200980150160.1, 12 pages.

\* cited by examiner

LASER ARRAY ILLUMINATION FOR BRIGHT PROJECTORS

CROSS-REFERENCES TO RELATED APPLICATIONS

The present application claims priority from and is a non-provisional application of U.S. Provisional Application No. 61/539,430, entitled "LASER ARRAY ILLUMINATION" filed Sep. 26, 2011, the entire contents of which are herein incorporated by reference for all purposes.

BACKGROUND

Most high brightness projectors available now use either Xenon lamps or ultra high performance (UHP) Mercury arc lamps. High-wattage Xenon lamps are often used in projectors for digital cinema, large venues, and for fixed installations. Such projectors typically use Xenon lamps with wattage range of 2-6 kW, and have brightness in the range of 10,000-30,000 lumens. High-wattage Xenon lamps have relatively short lifetime, typically in the range of 500-1000 hours. UHP Mercury arc lamps are often used in compact and portable projectors for home or office use. Such projectors typically use UHP Mercury arc lamps with wattage range of 120-350 W, and have brightness in the range of 1000-5000 lumens. UHP Mercury arc lamps have a typical lifetime of about 2000 hours, which is still relatively short.

Therefore, it is desirable to have projectors that utilize light sources with much longer lifetimes while still providing suitable brightness.

BRIEF SUMMARY

Embodiments of the present invention provide apparatuses and systems for providing illumination for projectors. One or more beam combiners are used to combine multiple light beams to provide a combined light beam toward to a pupil of an imaging device in a projector. Solid state light sources, such as diode lasers and light-emitting diodes (LEDs), may be used as light sources at relatively low cost and low power, and with long lifetime.

In one embodiment, an optical beam combiner capable of combining three or more light beams is provided. The optical beam combiner comprises a first reflective surface, a second reflective surface, and a transparent region disposed between the first reflective surface and the second reflective surface. The first reflective surface is operable to reflect a first light beam incident in a first indirection into a direction toward a pupil of an optical system. The second reflective surface is operable to reflect a second light beam incident in a second direction into a direction toward the pupil. The second direction opposes the first direction. The transparent region is operable to transmit a third light beam incident in a direction toward the pupil.

In another embodiment, an optical device comprising an array of optical beam combiners is provided. The array of optical beam combiners comprises a plurality of rows and a plurality of columns. Each row comprises a plurality of optical beam combiners disposed in a row direction. Each column comprises a plurality of optical beam combiners disposed in a column direction. Each row of optical beam combiners is staggered in a direction toward a pupil of an optical system, so that a plurality of light beams propagating in the row direction may be incident on respective optical beam combiners and be reflected toward the pupil.

In a further embodiment, an optical device for providing illumination to a pupil of an optical system is provided. The optical device comprises a first light source, a second light source, and an optical beam combiner. The first light source comprises a first plurality of lasers mounted on a first curved surface such that light beams emitted by the first plurality of lasers form a first light bundle converging toward a first region in a first direction. The second light source comprises a second plurality of lasers mounted on a second curved surface such that light beams emitted by the second plurality of lasers form a second light bundle converging toward a second region in a second direction. The second direction opposes the first direction. The optical beam combiner comprises a first reflective surface and a second reflective surface operable to reflect the first light bundle and the second light bundle, respectively, toward the pupil.

These and other aspects of the present disclosure will become apparent from the following description of various embodiments taken in conjunction with the following drawings, although variations and modifications therein may be effected without departing from the spirit and scope of the novel concepts of the disclosure.

DETAILED DESCRIPTION OF THE INVENTION

Most high brightness projectors available now use either Xenon lamps or UHP Mercury arc lamps. High-wattage Xenon lamps and UHP Mercury arc lamps, however, have relatively short lifetime. Therefore, it is desirable to have projectors that utilize light sources with much longer lifetimes while still providing suitable brightness. Embodiments of the present invention provide apparatuses and systems for providing illumination for projectors. One or more beam combiners may be used to combine multiple light beams emitted from multiple light sources to provide a combined light beam with high brightness. Solid state light sources, such as diode lasers and LEDs, may be used as light sources at relatively low cost and low power, and with long lifetime. Such light sources can be combined on a curved surface to provide multiple convergent light beams to a reflective surface.

I. Introduction

Figure 1:
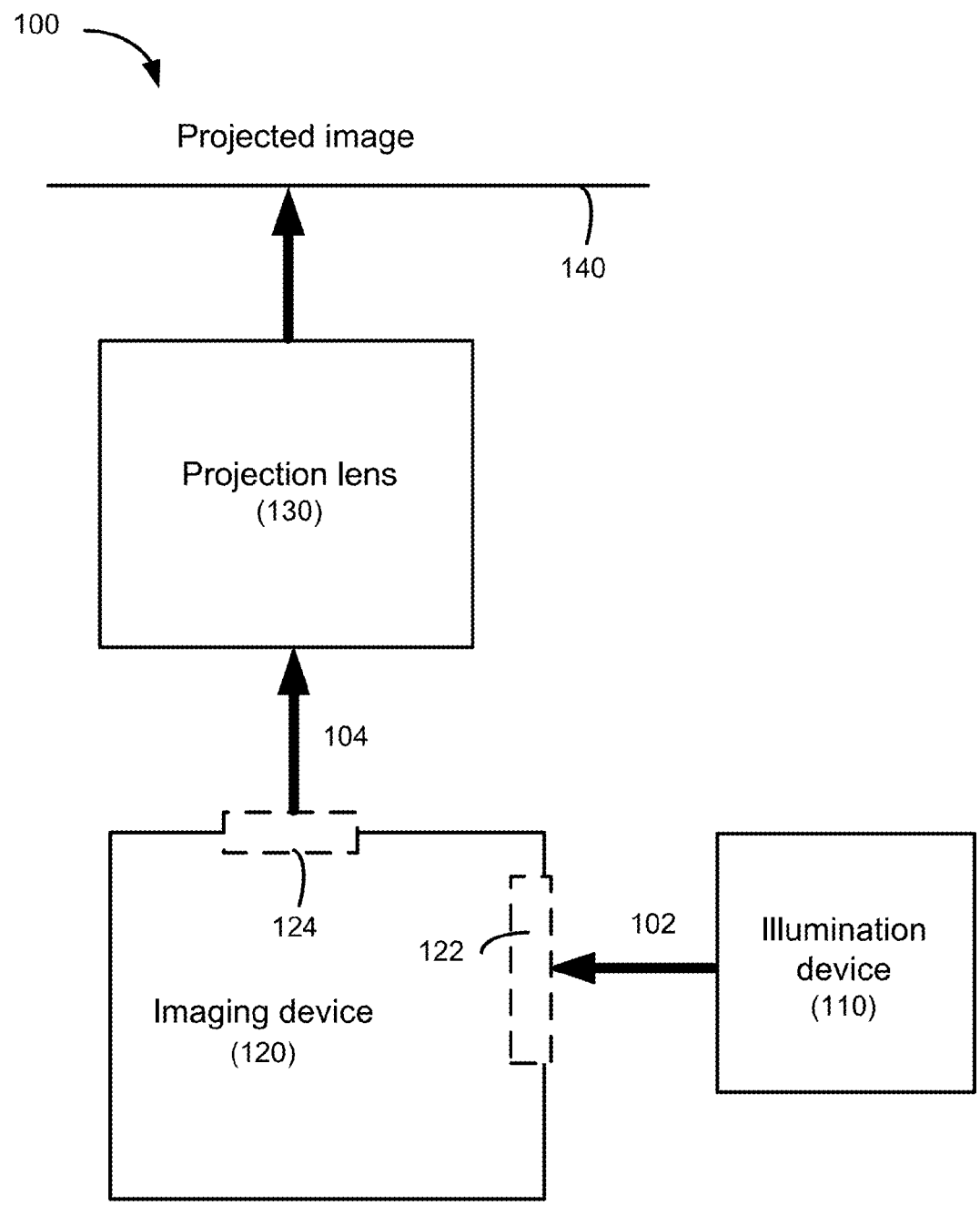
FIG. 1 is a simplified block diagram of a projection system.

FIG. 1 is a simplified block diagram of a projection system 100 that may utilize embodiments of the present invention. Light 102 provided by an illumination device 110 enters an entrance pupil 122 of an imaging device 120. The imaging device 120 converts the light into an image by modulating the amplitude of the light in various spatial regions corresponding to various pixels of the image. The modulated light 104 exits the exit pupil 124 of the imaging device 120 (e.g., including a digital micromirror device DMD), and subsequently passes through a projection lens 130 to form a projected image at a display device 140 (e.g., a wall, screen, coated glass, etc.). Embodiments of the present invention, as will be described in more detail below, provide illumination devices for providing light to the entrance pupil 122 (also referred hereinafter simply as the "pupil") of the imaging device 120. Pupil 122 may be of various shapes, which illumination device 110 can take into account, such as circular or square.

II. Beam Combiner with a Transparent Region

According to various embodiments of the invention, beam combiners may be used to combine light beams emitted from multiple light sources to provide a combined light beam to a pupil of an imaging device.

A. Beam Combiner with Two Reflective Surfaces and a Transparent Region

Figure 2:
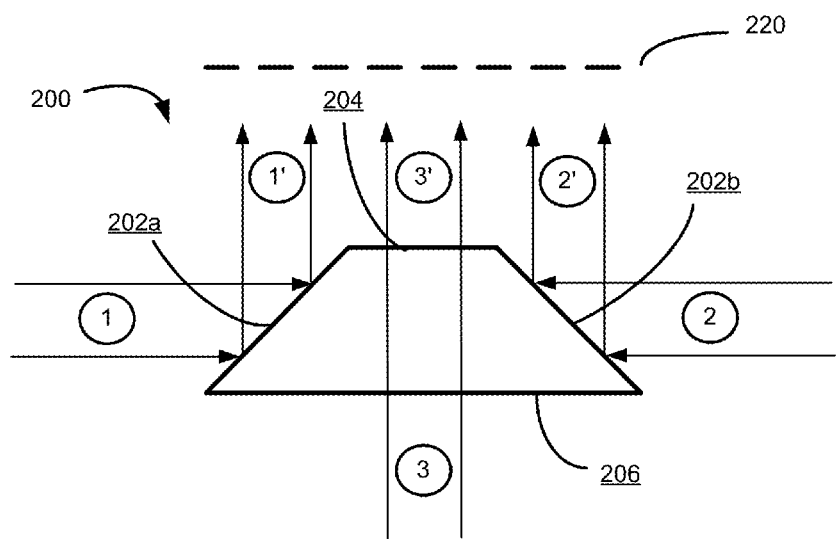
FIG. 2 is a cross-sectional view of a simplified schematic diagram of an optical beam combiner according to an embodiment of the invention, along with schematic ray diagrams.
Figure 2:
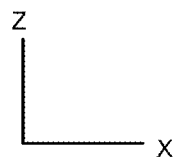

FIG. 2 is a cross-sectional view of a simplified schematic diagram of an optical beam combiner (also referred herein as "beam combiner") 200 according to an embodiment of the present invention, along with schematic ray diagrams. The beam combiner 200 has a first reflective surface 202a, a second reflective surface 202b, and a transparent region 204. The transparent region 204 is disposed between the first reflective surface 202a and the second reflective surface 202b. The first reflective surface 202a is operable to reflect a first light beam 1 incident in a first direction (e.g., in the +x direction) into a direction (e.g., the +z direction) toward a pupil 220. The second reflective surface 202b is operable to reflect a second light beam 2 incident in a second direction (e.g., in the −x direction) into a direction toward the pupil 220. The second direction opposes the first direction. The transparent region 204 is operable to transmit a third light beam 3 incident in a direction toward the pupil 220. The first reflected light beam 1', the second reflected light beam 2', and the third transmitted light beam 3' form a combined light beam that may proceed through the pupil 220 of the imaging device.

The term "opposing" herein refers to a configuration where a component of one light beam and a component of another light beam are directed in opposite directions. Under this definition, the two light beams can be, but does not have to be "directly opposing" each other. The term "directly opposing" herein refers to directions that are anti-parallel, e.g., the +x direction and the −x direction.

The beam combiner 200 having a transparent region 204 allows three light beams incident in three different directions to be combined into one combined light beam. Therefore, an increased brightness of the combined light beam may be achieved. The advantage afforded by having a transparent region in a beam combiner may be further leveraged in further embodiments of the present invention as described herein.

In one embodiment, the beam combiner 200 comprises a hollow shell in the shape of a roof with a flat top portion, and the transparent region 204 being a hole in the flat top portion. In another embodiment, the beam combiner 200 comprises a prism with a trapozoid cross section. The two reflective surfaces 202a and 202b may be metallised with visible-light enhanced aluminum deposition, cold-mirror deposition, or other types of high-reflection coating suitable for the purposes. The transparent region 204 can be uncoated or have an anti-reflective coating.

In one embodiment, each of the two reflective surfaces 202a and 202b forms an approximately 45-degree angle with respect to a base 206 of the beam combiner 200. In this case, a normal of the first reflective surface 202a and a normal of the second reflective surface 202b are approximately orthogonal to each other. The first light beam 1 and the second light beam 2 may be incident on the first reflective surface 202a and the second reflective surface 202b, respectively, at approximately a 45-degree angle of incidence, (i.e., the first incident light beam 1 and the second incident light beam 2 are approximately parallel to the x direction,) so that the reflected light beams 1' and 2' would be parallel to the z direction.

In other embodiments, each of the first reflective surface 202a and the second reflective surface 202b forms an angle with respect to the base 206 of the beam combiner 200 that is different from 45 degrees. In this case, in order for the reflected light beams 1' and 2' to be parallel to the z direction, the first incident light beam 1 and the second incident light beam 2 may be tilted with respect to the x direction.

In one embodiment, each light beam comprises a collimated light beam. A collimated light beam may be provided by, for example, a laser, with or without additional collimating optics. In other embodiments, each light beam may comprise a non-collimated light beam. A non-collimated light beam may be provided by a laser, an LED, a lamp, or the like.

B. Beam Combiner with Four Reflective Surfaces and a Transparent Region

Figure 3:
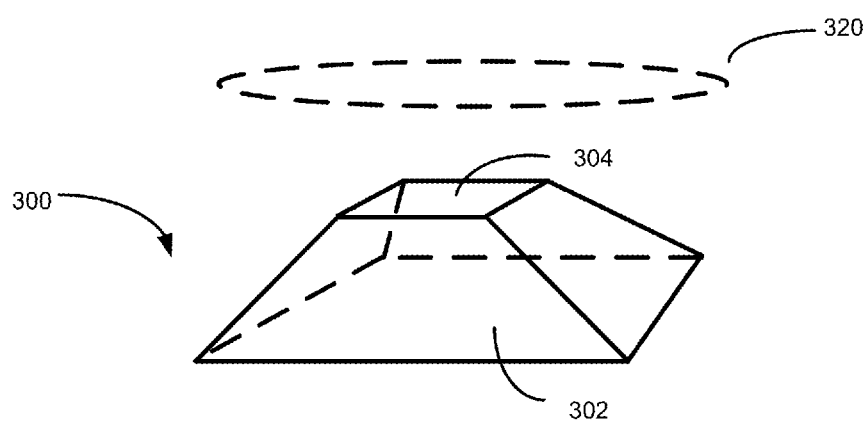
FIG. 3 is a perspective view of a simplified schematic diagram of an optical beam combiner according to another embodiment of the invention.
Figure 3:
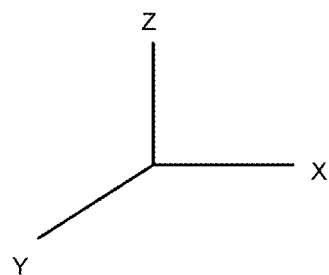

FIG. 3 is a perspective view of a simplified schematic diagram of a beam combiner 300 according to another embodiment of the invention. In the example shown, the beam combiner 300 is shaped as a pyramid with a flat top portion. Each of the four sides of the pyramid 302 is a reflective surface, operable to relfect light emitted from a light source, such as a laser. The top portion of the pyramid is a transparent region 304, operable to transmit light emitted from a light source. It should be appreciated that, according to other embodiments, the beam combiner 300 may be characterized by other shapes different from a pyramid. One of ordinary skill in the art would recognize many variations, modifications, and alternatives.

In one embodiment, the beam combiner 300 comprises a hollow shell, with the transparent region 304 being a hole. In another embodiment, the beam combiner 300 comprises a prism. The four reflective surfaces 302 may be metallised with visible-light enhanced aluminum deposition, cold-mirror deposition, or other types of high-reflection coating suitable for the purposes. The transparent region 304 can be uncoated or have an anti-reflective coating.

The beam combiner 300 may be used to combine up to five light beams incident in five different directions into a combined light beam toward a pupil 320 of an imaging device. For example, four light beams incident in the +x, −x, +y, and −y directions, may be reflected by the four reflective surfaces 302, respectively, toward the +z direction, and a fifth light beam incident in the +z direction may be transmitted by the transparent region 304. Therefore, the beam combiner 300 with four reflective surfaces 302 and a transparent region 304 may be used to provide a combined light beam with even higher brightness than that afforded by the beam combiner 200 shown in FIG. 2, which has only two reflective surfaces 202 and a transparent region 204.

According to various embodiments, each of the four reflective surfaces 302 of the beam combiner 300 may form an angle with respect to a base (i.e., a x-y plane) of the beam combiner 300 that is approximately 45 degrees or different from 45 degrees. Accordingly, light beams incident on the four reflective surfaces 302 may be parallel to or tilted with respect to the x-y plane. According to various embodiments of the invention, the beam combiner 300 may be used to combine collimated or non-collimated light beams.

III. Array of Beam Combiners

Beam combiners 200 or 300 as described above may be used to provide a scalable illumination source with additional brightness when configured as an array. An array of beam combiners may allow multiple arrays of light beams incident from different directions to be combined into a combined light beam toward the pupil of an imaging device. Each array of light beams may be provided by multiple light sources operable to emit light in a same general direction. As such, the advantage afforded by the beam combiner 200 or 300 is further leveraged, as will be apparent from the examples described below.

A. Array of Beam Combiners Staggered in One Direction

Figure 4:
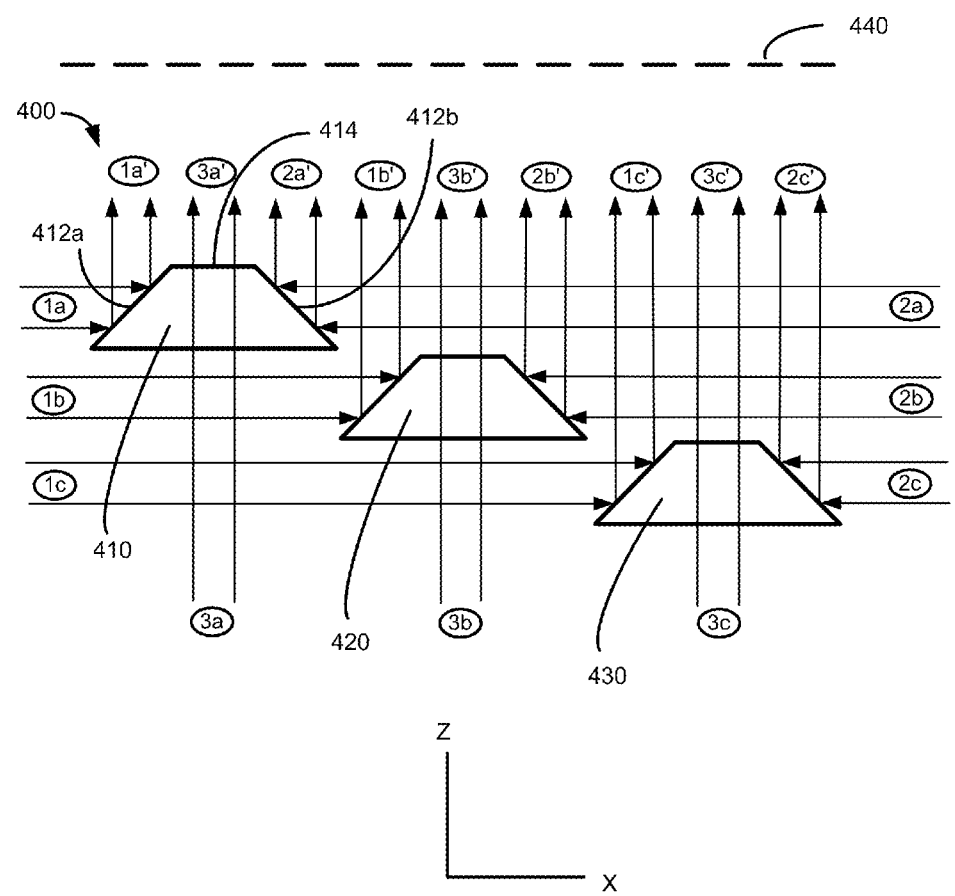
FIG. 4 is a cross-sectional view of a simplified schematic diagram of an array of optical beam combiners according to an embodiment of the invention, along with schematic ray diagrams.

FIG. 4 is a cross-sectional view of a simplified schematic diagram of an optical device 400 according to an embodiment of the invention, along with schematic ray diagrams. In this illustrative example, the optical device 400 comprises a row of three beam combiners 410, 420, and 430, disposed along the x direction. The three beam combiners 410, 420, and 430 are staggered in the z direction, such that their z coordinates are successively offset with respect to each other by approximately the height of each beam combiner in the z direction.

Similar to the beam combiner 200 shown in FIG. 2, each beam combiner 410, 420, or 430 has a first reflective surface 412a, a second reflective surface 412b, and a transparent region 414. As shown in FIG. 4, the array of beam combiners 410, 420, and 430 is operable to reflect a first set of three light beams 1a-1c, all incident in the +x direction, via their respective first reflective surfaces 412a toward a pupil 440 of an imaging. The staggered arrangement of the three beam combiners 410, 420, and 430 ensures that the three light beams 1a-1c would reach the respective first reflective surfaces 412a without being blocked by another beam combiner. Similarly, the array of beam combiners 410, 420, and 430 is operable to reflect a second set of three light beams 2a-2c, all incident in the −x direction, via their respective second reflective surfaces 412b toward the pupil 440 of the imaging device.

In addition, the array of beam combiners 410, 420, and 430 is operable to transmit a third set of three light beams 3a-3c, all incident in the +z direction, via their respective transparent regions 414. In this manner, a total of nine incident light beams 1a'-1c', 2a'-2c', and 3a'-3c' may be combined into a combined light beam toward the pupil 440 of the imaging device, thereby achieving a high brightness. It should be appreciated that, although the optical device 400 includes three beam combiners as an illustrative example, the optical device 400 may include more than or less than three beam combiners according to various embodiments.

In one embodiment, the optical device 400 may further comprise columns of beam combiners disposed along the y direction, which is perpendicular to the paper of FIG. 4. In one embodiment, each column of beam combiners is positioned at the same z coordinate. For instance, in the example shown in FIG. 4, a first column would have beam combiners directly above or below the beam combiner 410 in the direction perpendicular to the paper, a second column would have beam combiners directly above or below the beam combiner 420, and so on and so forth. Such an array of beam combiners may be used to combine three arrays of light beams incident in three different directions into a combined light beam toward the pupil 440 of the imaging device. Each array of light beams may be provided by a two dimensional array of light sources operable to emit light in a same general direction, as described immediately below.

Figure 5:
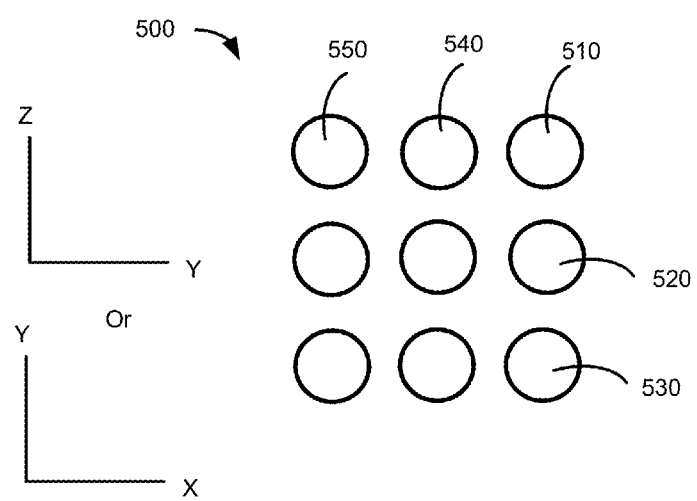
FIG. 5 is a plan view of a simplified schematic diagram of an array of light sources according to an embodiment of the invention.

FIG. 5 is a plan view of a simplified schematic diagram of a two-dimensional array 500 of light sources according to an embodiment of the invention. Each light source 510-550 is operable to emit a light beam in a direction perpendicular to the paper of FIG. 5. In one embodiment, the two-dimensional array 500 of light sources comprises a plurality of rows and a plurality of columns disposed in the y direction and the z direction, respectively.

When used in conjunction with the optical device 400 shown in FIG. 4, the array 500 of light sources may be configured to provide an array of light beams propagating in the +x (or −x) direction, to be reflected by the respective first (or the second) reflective surfaces of the array 400 of beam combiners. For example, the array 500 of light sources may be configured such that light beams emitted by each column of light sources (e.g., the first column of light sources 510, 520, and 530) would be reflected by the respective first (or second) reflective surfaces of a corresponding row of beam combiners (e.g., beam combiners 410, 420, and 430), and light beams emitted by each row of light sources (e.g., the first row of light sources 510, 540, and 550) would be reflected by the respective first (or second) reflective surfaces of a corresponding column of beam combiners (e.g., a column of beam combiners disposed in a direction perpendicular to the paper of FIG. 4).

In another embodiment, the two-dimensional array 500 of light sources comprises a plurality of rows and a plurality of columns disposed in the x direction and the y direction, respectively. When used in conjunction with the optical device 400 shown in FIG. 4, the array 500 of light sources may be configured to provide an array of light beams propagating in the +z direction, to be transmitted by the respective transparent regions of the array 400 of beam combiners.

In the manner described above, the array 400 of beam combiners shown in FIG. 4 may be used, in conjunction with one or more two-dimensional arrays 500 of light sources as shown in FIG. 5, to construct a scalable illumination device. Such an illumination device is scalable in the sense that higher brightness may be achieved by increasing the number of beam combiners, and proportionally increasing the number of light sources. Therefore, a high-brightness illumination device may be achieved.

Figure 6:
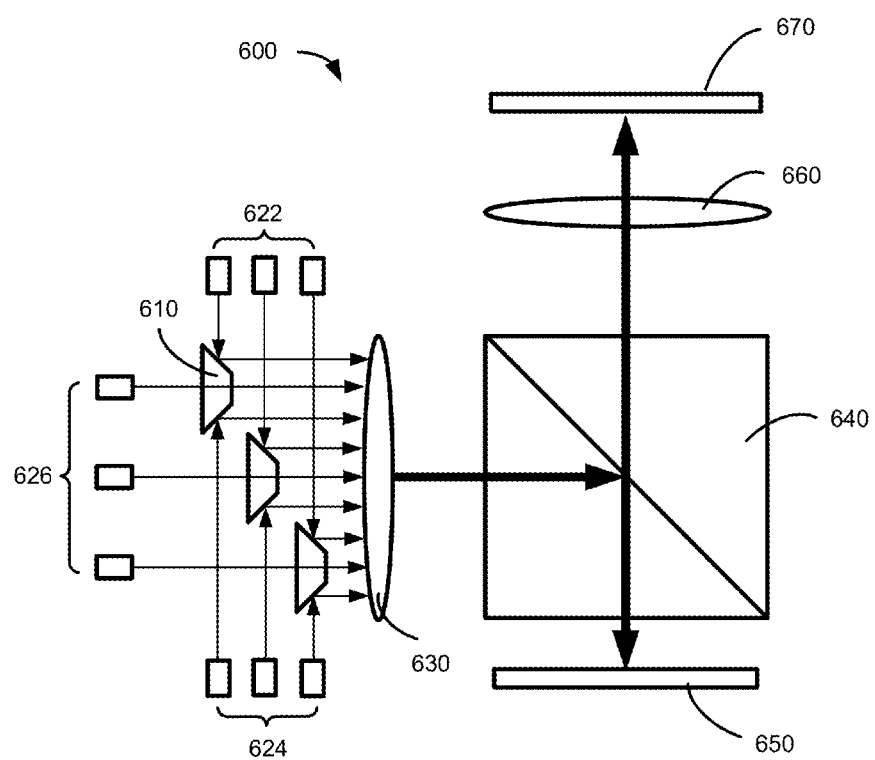
FIG. 6 is a cross-sectional view of a simplified schematic diagram of a projection system according to an embodiment of the invention.

FIG. 6 is a cross-sectional view of a simplified schematic diagram of a projection system 600 utilizing such an illumination device, according to an embodiment of the invention. The projection system 600 comprises an array of beam combiners 610 arranged in a staggered fashion, as described above in relation to FIG. 4. A first array of light sources 622, a second array of light sources 624, and a third array of light sources 626 are operable to emit light beams incident from three different directions. The array of beam combiners 610 is operable to reflect or transmit the light beams emitted by the three arrays of light sources 622, 624, and 626 to form a combined light beam.

The combined light beam (represented by a thick arrow) proceeds through a condenser lens 630 and a total internal reflection (TIR) prism 640, and is focused onto an imager 650, where the light rays are converted into video information. The imager 650 may comprise, for example, a digital micromirror device (DMD), a liquid crystal light valve, or the like, which modulates the amplitude of the light rays in various spatial regions corresponding to various pixels of an image. The modulated light rays then pass through a projection lens 660 to form an enlarged image at a display device 670.

In one embodiment, the projection system 600 may be used for displaying color images. For example, each of the three arrays of light sources 622, 624, or 626 may be operable to emit light of one of the three primary colors, namely red, green, and blue. The array of beam combiners 610 combines the light beams emitted by the three arrays of light sources 622, 624, or 626 to form a combined white light beam.

B. Array of Beam Combiners Staggered in Two Directions

In another embodiment, an array of beam combiners may be staggered in both the row direction and the column direction. Such an array of beam combiners, as described below, would have the advantage of being able to combine two additional arrays of light beams, thereby achieving even higher brightness.

Figure 7:
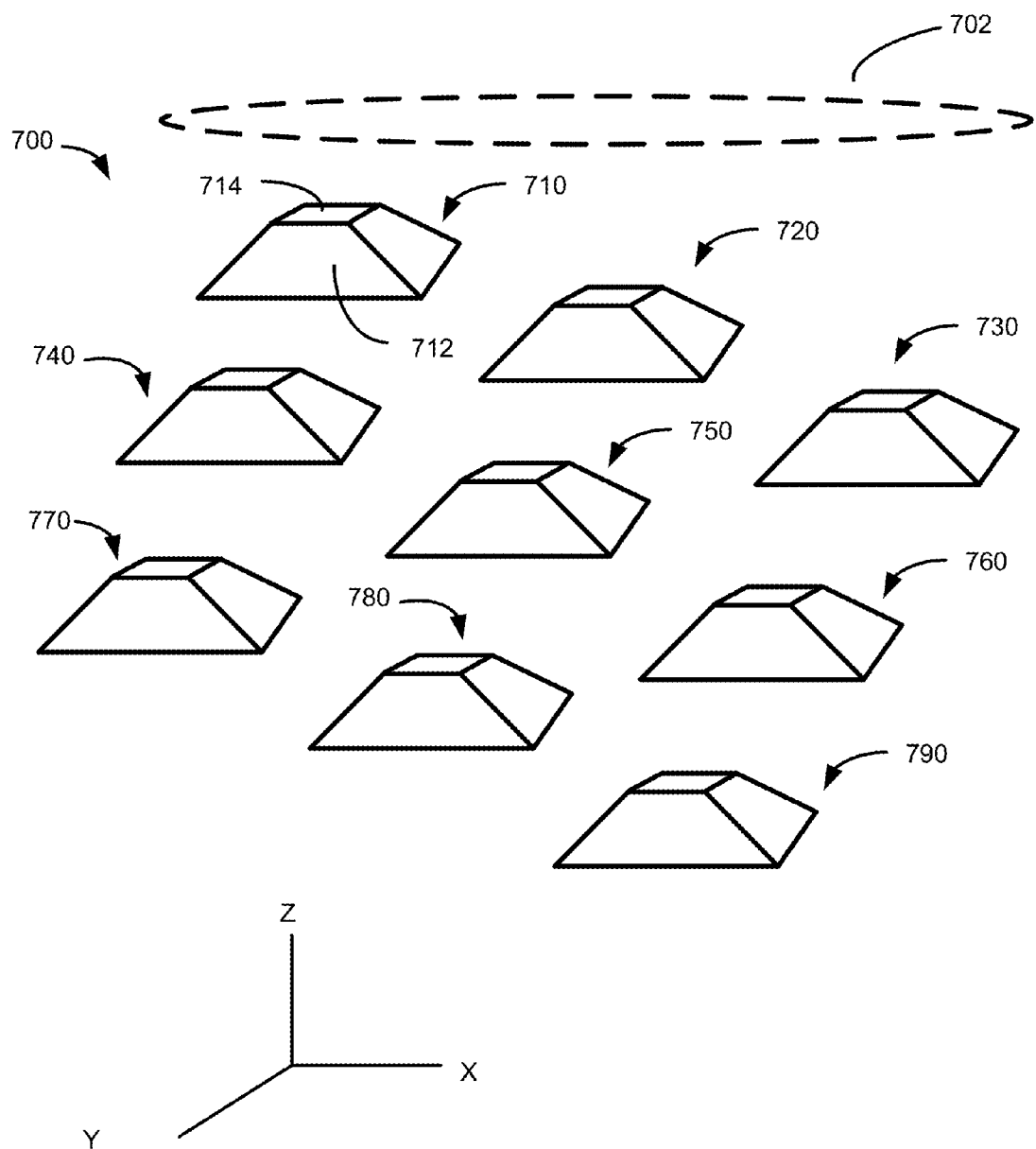
FIG. 7 is a perspective view of a simplified schematic diagram of an array of optical beam combiners according to another embodiment of the invention.

FIG. 7 is a perspective view of a simplified schematic diagram of an optical device 700 according to an embodiment of the invention. The optical device 700 includes an array of beam combiners that comprises a plurality of rows and a plurality of columns. In this illustrative example, each row comprises three beam combiners (e.g., 710, 720, and 730) disposed in a row direction (e.g., in the x direction). Each column comprises three beam combiners (e.g., 710, 740, and 770) disposed in a column direction (e.g., in the y direction).

As shown, each beam combiner is shaped as a pyramid with a flat top portion, similar to the beam combiner 300 shown in FIG. 3. Each of the four sides of the pyramid is a reflective surface 712. The top portion of the pyramid is a transparent region 714. It should be appreciated that each beam combiner may be characterized by other shapes different from a pyramid. One of ordinary skill in the art would recognize many variations, modifications, and alternatives. It should also be appreciated that, although the optical device 700 includes nine beam combiners as an illustrative example, the optical device 700 may include more than or less than nine beam combiners according to various embodiments.

As shown in FIG. 7, each row of beam combiners is staggered in the z direction, such that their z coordinates are successively offset with respect to each other by approximately the height of each beam combiner in the z direction. In addition, each column of beam combiners is also staggered in the z direction. For instance, in the first row comprising beam combiners 710, 720, and 730, the second beam combiner 720 is positioned below the first beam combiner 710 in the z direction, and the third beam combiner 730 is positioned below the second beam combiner 720 in the z direction. Similarly, in the first column comprising beam combiners 710, 740, and 770, the second beam combiner 740 is positioned below the first beam combiner 710 in the z direction, and the third beam combiner 770 is positioned below the second beam combiner 740 in the z direction. Note that, arranged in this fashion, the beam combiners 740 and 720 would have the same z coordinate, the beam combiners 770, 750, and 730 would have the same z coordinate, and the beam combiners 780 and 760 would have the same z coordinate.

The array 700 of beam combiners may be used to combine up to five arrays of light beams incident in five different directions (e.g., in the +x, −x, +y, −y, and +z directions, respectively) into one combined light beam toward a pupil 702 of an imaging device. Therefore, an illumination device using the array 700 of beam combiners in conjunction with five two-dimensional arrays of light sources is capable of achieving even higher brightness as compared to that afforded by the embodiment shown in FIG. 4.

Figure 8:
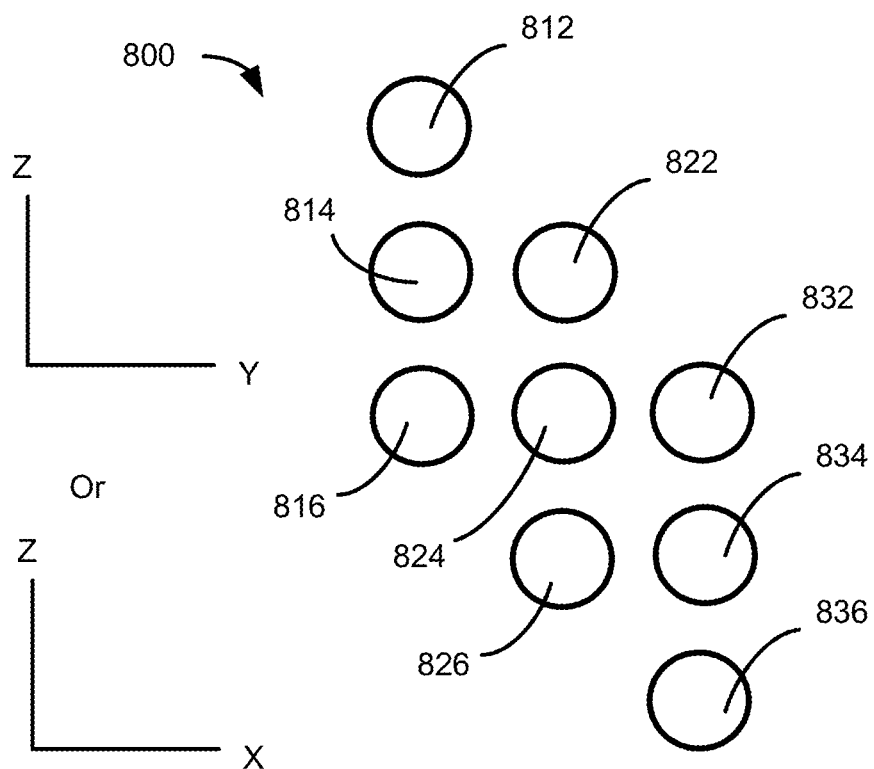
FIG. 8 is a plan view of a simplified schematic diagram of an array of light sources according to another embodiment of the invention.

FIG. 8 is a plan view of a simplified schematic diagram of a two-dimensional array 800 of light sources according to an embodiment of the invention, which may be used in conjunction with the array 700 of beam combiners to construct an illumination device. The array 800 of light sources comprises a plurality of columns of light sources 812-836 disposed in the z direction. Each light source is operable to emit a light beam in a direction perpendicular to the paper of FIG. 8.

Successive columns are offset with respect to each other in the z direction by approximately the height of each beam combiner. For instance, the second column comprising light sources 822, 824, and 826 is shifted downward in the z direction with respect to the first column comprising light sources 812, 814, and 816, such that the first light source 822 in the second column is at about the same z coordinate as that of the second light source 814 in the first column, the second light source 824 in the second column is at about the same z coordinate as that of the third light source 816 in the first column, and so on and so forth.

In one embodiment, the two-dimensional array 800 of light sources comprises a plurality of rows and a plurality of columns disposed in the y direction and the z direction, respectively. When used in conjunction with the optical device 700 shown in FIG. 7, the array 800 of light sources may be configured to provide an array of light beams propagating in the +x (or −x) direction, to be reflected by the respective first (or the second) reflective surfaces of the array 700 of beam combiners. For example, the array 800 of light sources may be configured such that light beams emitted by each column of light sources disposed in the z-direction (e.g., the first column of light sources 812, 814, and 816) would be reflected by the respective first (or second) reflective surfaces of a corresponding row of beam combiners (e.g., the first row of beam combiners 710, 720, and 730); and light beams emitted by each row of light sources disposed in the y-direction (e.g., the first row of light sources 812, 822, and 832) would be reflected by the respective first (or second) reflective surfaces of a corresponding column of beam combiners (e.g., the first column of beam combiners 710, 740, and 770).

In another embodiment, the two-dimensional array 800 of light sources comprises a plurality of rows and a plurality of columns disposed in the x direction and the z direction, respectively. When used in conjunction with the optical device 700 shown in FIG. 7, the array 800 of light sources may be configured to provide an array of light beams propagating in the +y (or −y) direction, to be reflected by the respective third (or the fourth) reflective surfaces of the array 700 of beam combiners.

To provide an array of light beams propagating in the +z direction to be transmitted by the transparent surfaces 714 of the array 700 of beam combiners shown in FIG. 7, a non-staggered two-dimensional array of light sources, similar to the array 500 of light sources shown in FIG. 5, may be used.

A non-staggered array of light sources is used in this case because the projection of the array 700 of beam combiners in an x-y plane is not staggered.

Figure 9:
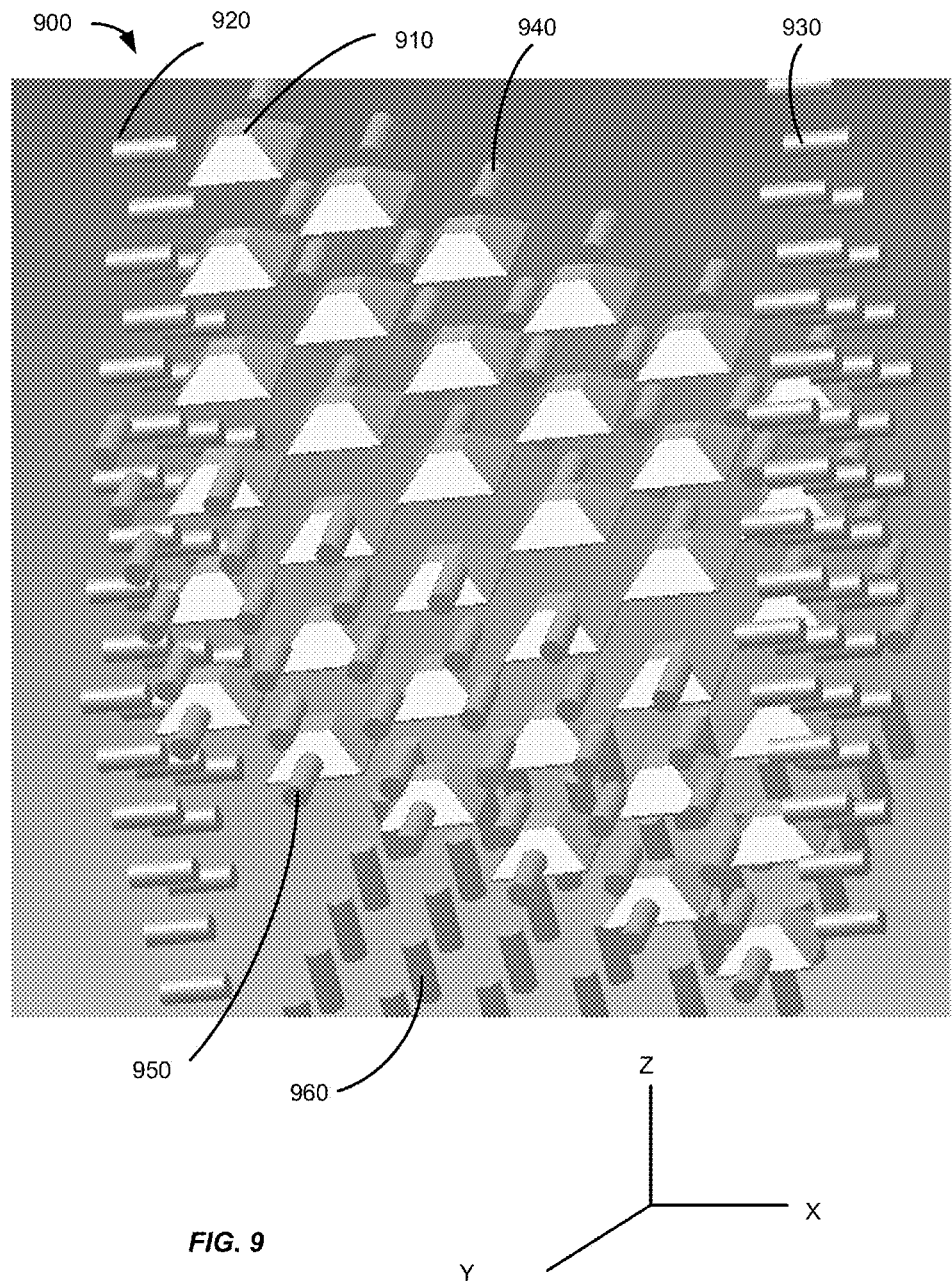
FIG. 9 is a perspective view of an optical system according to an embodiment of the invention.

FIG. 9 is a perspective view of an optical device 900 according to an embodiment of the invention. The optical device 900 includes an array of beam combiners 910 staggered in both the row direction (e.g., the x direction) and the column direction (e.g., the y direction), and five two-dimensional arrays of light sources 920, 930, 940, 950, and 960 operable to provide five arrays of light beams incident in the +x, −x, +y, −y, and +z directions, respectively. The array of beam combiners 910 is operable to combine the five arrays of light beams into a combine light beam toward the +z direction.

The optical device 900 may be used as an illumination device in a projection system similar to the projection system 600 shown in FIG. 6. The combined light beam would proceed through the condenser lens 630, and be focused onto the imager 650, where the light rays are converted into video information. In one embodiment, the array of beam combiners 910 may be configured to match a shape of a pupil of the imaging device in the projection system 600, as described immediately below. The pupil of the imaging device may be defined by, for example, the diameter of the condenser lens 630, an aperture stop, or the like.

Figure 10:
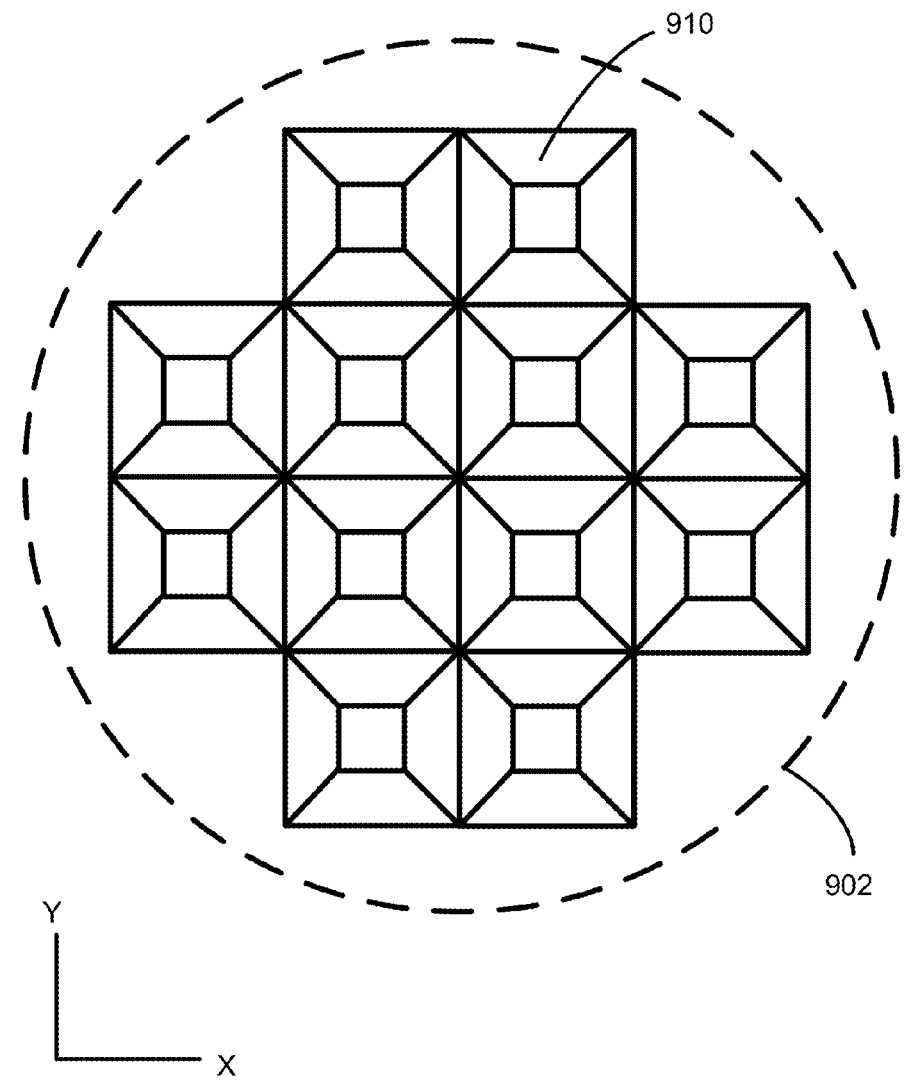
FIG. 10 is a top view of a simplified schematic diagram of an array of optical beam combiners according to an embodiment of the invention.

FIG. 10 is a top view (from the −z direction) of a simplified schematic diagram of an array of beam combiners 910 according to an embodiment of the invention. In this illustrative example, the array of beam combiners 910 is arranged in four rows and four columns disposed in the x direction and the y direction, respectively. Each of the two middle rows (or columns) comprises four beam combiners 910, whereas each of the two outer rows (or columns) comprises two beam combiners 910. With this arrangement, a combined light beam would have a cross section that has an outer periphery that more closely matches a circular pupil 902. In this manner, the potential waste of light that falls outside the pupil 902 is avoided.

The optical device 900 shown in FIG. 9 may be used as a scalable illumination source for a projection system. Such an illumination source has the advantage that five arrays 920, 930, 940, 950, and 960 of light sources mounted on five separate plates are used to provide a combined light beam for an pupil of an imaging device. In this manner, the heat load on each plate may be more manageable compared to the case where all light sources are mounted on a single plate. When used in a color projection system, three of the five arrays of light sources may be configured to provide red, green, and blue light, respectively. The remaining two arrays of light sources may be configured to provide white light, or light of a redundant primary color.

IV. Light Sources Mounted on a Curved Surface

In some of the embodiments discussed above, it is implicitly assumed that each light source comprises a single light-emitting device, such as a diode laser or an LED, and that each reflective surface of a beam combiner reflects a light beam provided by a single light-emitting device. However, this does not have to be the case. According to some embodiments of the invention, a light source may comprise a plurality of light-emitting devices operable to provide a light bundle to be incident on a reflective surface of a beam combiner. The examples described below illustrate some embodiments using beam combiners in conjunction with light sources comprising a plurality of light-emitting devices.

A. Beam Combiner with Two Reflective Surfaces

Figure 11:
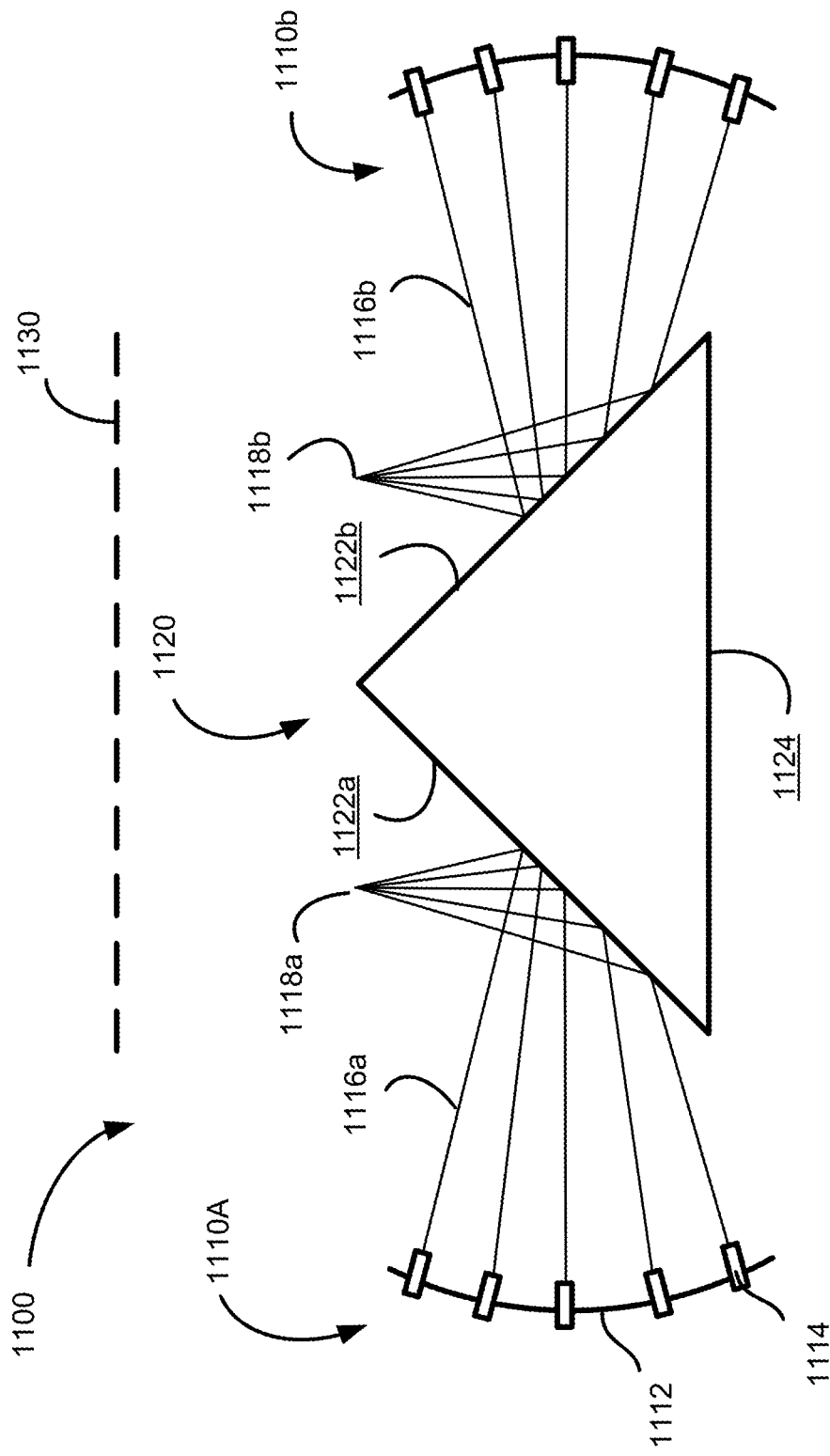
FIG. 11 is a cross-sectional view of a simplified schematic diagram of an optical device according to another embodiment of the invention, along with schematic ray diagrams.

FIG. 11 is a cross-sectional view of a simplified schematic diagram of an optical device 1100 according to an embodiment of the invention, along with schematic ray diagrams. The optical device 1100 comprises a beam combiner 1120, a first light source 1110a, and a second light source 1110b. Each of the first light source 1110a and the second light source 1110b comprises a plurality of light-emitting devices 1114 mounted on curved surface 1112, such that central rays of the light beams emitted by the plurality of light-emitting devices 1114 converge toward a region in space. In one embodiment, each light-emitting device 1114 comprises a diode laser and is operable to provide a collimated light beam. In this case, the light beams emitted by the plurality of diode lasers 1114 form a light bundle that converges approximately to a point as if the light bundle is emitted by a virtual point source.

In one embodiment, the first light source 1110a is operable to provide a first light bundle 1116a converging toward a first region (i.e., an imaginary region where the extensions of the light rays 1116a would converge to) in a first direction. The second light source 1110b is operable to provide a second light bundle 1116b converging toward a second region (i.e., an imaginary region where the extensions of the light rays 1116b would converge to) in a second direction. The second direction opposes the first direction. The beam combiner 1120 includes a first reflective surface 1122a and a second reflective surface 1122b, operable to reflect the first light bundle 1116a and the second light bundle 1116b, respectively, toward a third direction toward a pupil 1130 of an imaging device. In the illustrative example shown in FIG. 11, the first light bundle 1116a and the second light bundle 1116b are intercepted by the first reflective surface 1122a and the second reflective surface 1122b, respectively, before fully converging to a point. The first light bundle 1116a and the second light bundle 1116b converge to respective points 1118a and 1118b after being reflected by the beam combiner 1120.

According to an embodiment, each of the first reflective surface 1122a and the second reflective surface 1122b forms an approximately 45-degree angle with respect to the base 1124 of the beam combiner 1120. That is, a normal of the first reflective surface 1122a and a normal of the second reflective surface 1122b are approximately orthogonal to each other. According to alternative embodiments, each of the first reflective surface 1122a and the second reflective surface 1122b forms an angle with respect to the base 1124 of the beam combiner 1120 that is different from 45 degrees.

B. Beam Combiner with Four Reflective Surfaces

Figure 12:
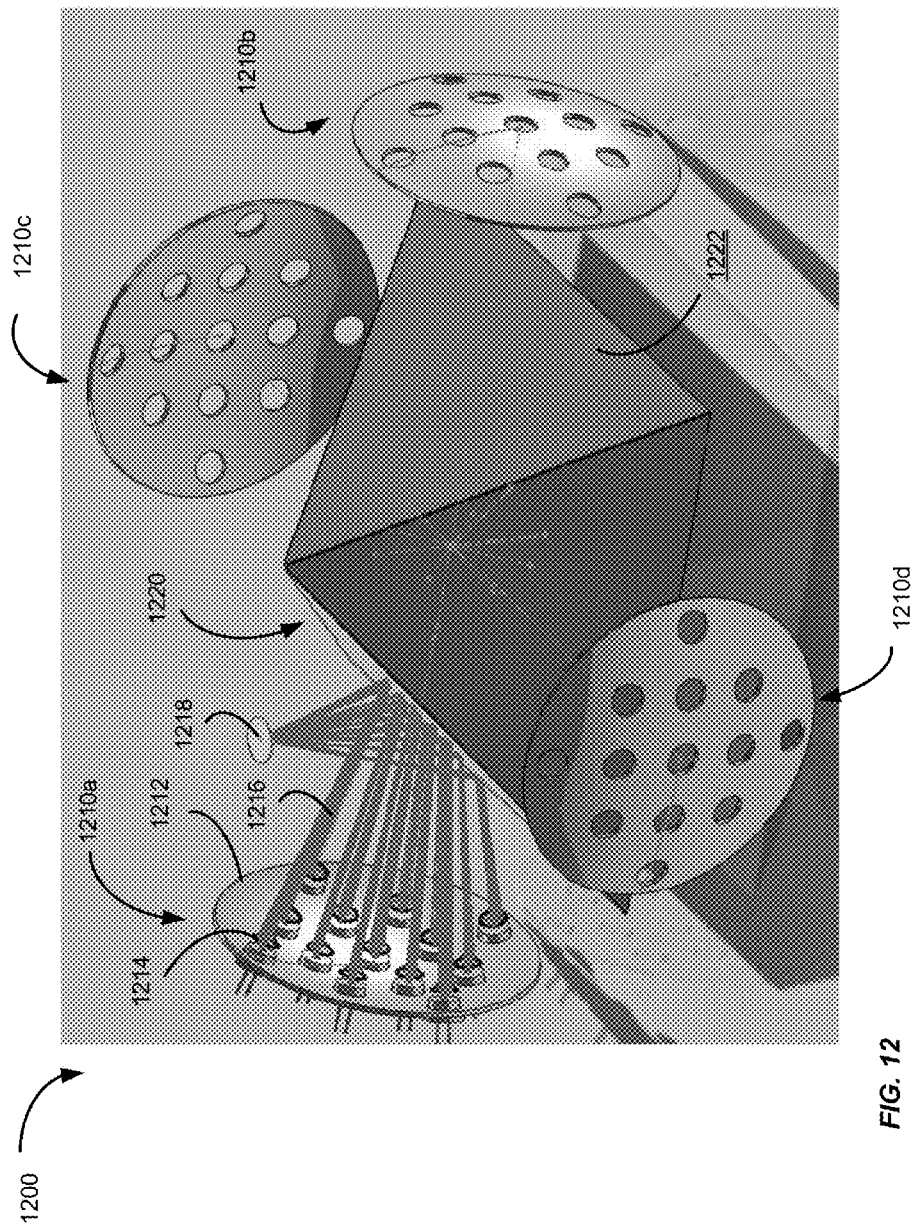
FIG. 12 is a perspective view of a simplified schematic diagram of an optical device according to a further embodiment of the invention, along with a partial ray tracing diagram.

FIG. 12 is a perspective view of a simplified schematic diagram of an optical device 1200 according to an embodiment of the invention, along with a partial ray tracing diagram. The optical device 1200 includes a beam combiner 1220 comprising four reflective surfaces 1222. In one embodiment, the beam combiner 1220 is shaped as a pyramid with each side of the pyramid being a reflective surface, although other shapes are possible. The beam combiner 1220 may be made of a hollow shell or a prism.

The optical device 1200 further includes four light sources 1210a-d. Each light source 1210 comprises a plurality of light-emitting devices 1214 mounted on a curved surface 1212. Each light-emitting device 1214 may comprise a diode laser, an LED, or the like, and is operable to emit a collimated light beam. The curved surface 1212 is shaped such that the light beams emitted by the plurality of light-emitting devices 1214 form a light bundle converging toward a region in the direction of beam propagation. For example, the curved surface 1212 may be shaped as part of a sphere such that the light bundle converges to approximately a point as if the light bundle is emitted from a virtual point source located at that point.

The four light sources 1210*a-d* and the beam combiner 1220 are configured such that each of the four reflective surfaces of the beam combiner 1220 are operable to reflect respective light bundles (e.g., 1216) provided by the four light sources 1210*a-d*. The reflected light bundles are directed toward a pupil (not shown) of an imaging device. In the example shown in FIG. 12, each reflected light bundle converges to approximately a point (e.g., 1218) in the direction toward the pupil.

The optical device 1200 may be used as an illumination device in a projection system. By using light sources each having multiple light-emitting devices, the illumination device may be capable of achieving even higher brightness as compared to illumination devices using a single light-emitting device for each light source. According to some embodiments, the optical device 1200 may be used in a color projection system. For example, three of the four light sources 1210*a-d* may be operable to provide red, green, and blue light, respectively. The fourth light source may be operable to provide white light, or light of a redundant primary color. In some embodiments, the optical device 1200 may be used as building blocks to construct a scalable illumination device comprising an array of beam combiners, similar to the illumination device 900 shown in FIG. 9.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An optical device for providing illumination from a plurality of light sources to a pupil of an optical system, the optical device comprising:
   a plurality of optical beam combiners disposed as an array, wherein the array comprises:
      a plurality of rows formed of optical beam combiners disposed in a row direction, wherein each row of optical beam combiners is staggered in a first direction toward the pupil such that, within each row, each successive beam combiner is offset toward the pupil with respect to the previous beam combiner; and
      a plurality of columns formed of optical beam combiners disposed in a column direction, wherein each column of optical beam combiners is staggered in the first direction toward the pupil such that, within each column, each successive beam combiner is offset toward the pupil with respect to the previous beam combiner;
      wherein the row direction and the column direction are different and define a two-dimensional plane, wherein the first direction is not parallel to the two-dimensional plane,
   wherein each optical beam combiner comprises:
      a first reflective surface operable to reflect a respective first light beam incident in a second direction into the first direction, the second direction being in the row direction; and
      a second reflective surface operable to reflect a respective second light beam incident in a third direction into the first direction, the third direction opposing the second direction;
      a third reflective surface operable to reflect a respective third light beam incident in a fourth direction into the first direction, the fourth direction being in the column direction; and
      a fourth reflective surface operable to reflect a respective fourth light beam incident in a fifth direction into the first direction, the fifth direction opposing the fourth direction;
   a plurality of first light sources, each first light source operable to emit a respective first light beam for a respective first surface;
   a plurality of second light sources, each second light source emit to provide a respective second light beam for a respective second surface;
   a plurality of third light sources, each third light source operable to emit a respective third light beam for a respective third surface; and
   a plurality of fourth light sources, each fourth light source operable to emit a respective fourth light beam for a respective fourth surface.

2. The optical device of claim 1, wherein a normal of the first reflective surface is orthogonal to a normal of the second reflective surface.

3. The optical device of claim 1, wherein each of the first light beam and the second light beam comprises a collimated light beam.

4. The optical device of claim 1, wherein each optical beam combiner further comprises a transparent region disposed between the first reflective surface and the second reflective surface, and operable to transmit a respective fifth light beam incident in the first direction.

5. The optical device of claim 4, wherein the transparent region comprises a hole or a transparent material.

6. The optical device of claim 1, wherein a normal of the third reflective surface is orthogonal to a normal of the fourth reflective surface.

7. The optical device of claim 4, wherein each first light source comprises a laser, each second light source comprises a laser, each third light source comprises a laser, each fourth light source comprises a laser, and each fifth light source comprises a laser.

8. The optical device of claim 1, wherein the row direction is perpendicular to the column direction, wherein the row direction is perpendicular to the first direction, and wherein the column direction is perpendicular to the first direction.

9. The optical device of claim 1, wherein each successive beam combiner is offset toward the pupil by a distance equal to the height of one beam combiner.

10. The optical device of claim 1, wherein each beam combiner within a certain row of beam combiners has the same position in the column direction as other beam combiners within the same row.

11. The optical device of claim 1, wherein the plurality of first light sources is disposed as an array comprising:
   a plurality of columns formed of first light sources disposed in the first direction, wherein each successive column of first light sources is shifted in the first direction with respect to the previous column by a same distance,
   wherein the plurality of second light sources is disposed as an array comprising:
   a plurality of columns formed of second light sources disposed in the first direction, wherein each successive column of second light sources is shifted in the first direction with respect to the previous column by a distance equal to the height of one beam combiner, wherein the plurality of third light sources is disposed as an array comprising:
a plurality of columns formed of third light sources disposed in the first direction, wherein each successive column of third light sources is shifted in the first direction with respect to the previous column by a distance equal to the height of one beam combiner, and
wherein the plurality of fourth light sources is disposed as an array comprising:
a plurality of columns formed of fourth light sources disposed in the first direction, wherein each successive column of fourth light sources is shifted in the first direction with respect to the previous column by a distance equal to the height of one beam combiner.

12. The optical device of claim 1, wherein each first light source is operable to emit a respective first light beam that propagates in the second direction, wherein each second light source is operable to emit a respective first light beam that propagates in the third direction, wherein each third light source is operable to emit a respective first light beam that propagates in the fourth direction, and wherein each fourth light source is operable to emit a respective first light beam that propagates in the fifth direction.

13. The optical device of claim 4, further comprising:
a plurality of fifth light sources, each fifth light source operable to emit a respective fifth light beam that propagates in the first direction for a respective transparent region.

14. The optical device of claim 13, wherein the plurality of fifth light sources comprises an array of light sources disposed in a plane defined by the row direction and the column direction.

\* \* \* \* \*

UNITED STATES PATENT AND TRADEMARK OFFICE
CERTIFICATE OF CORRECTION

| | | |
|---|---|---|
| PATENT NO. | : 8,905,578 B2 | Page 1 of 1 |
| APPLICATION NO. | : 13/624659 | |
| DATED | : December 9, 2014 | |
| INVENTOR(S) | : Oyvind Svensen et al. | |

It is certified that error appears in the above-identified patent and that said Letters Patent is hereby corrected as shown below:

On the title page item (73), should read:

PROJECTIONDESIGN AS
Gamle Fredrikstad (NO)

Signed and Sealed this
Twentieth Day of October, 2015

Michelle K. Lee
*Director of the United States Patent and Trademark Office*